Patented Mar. 9, 1954

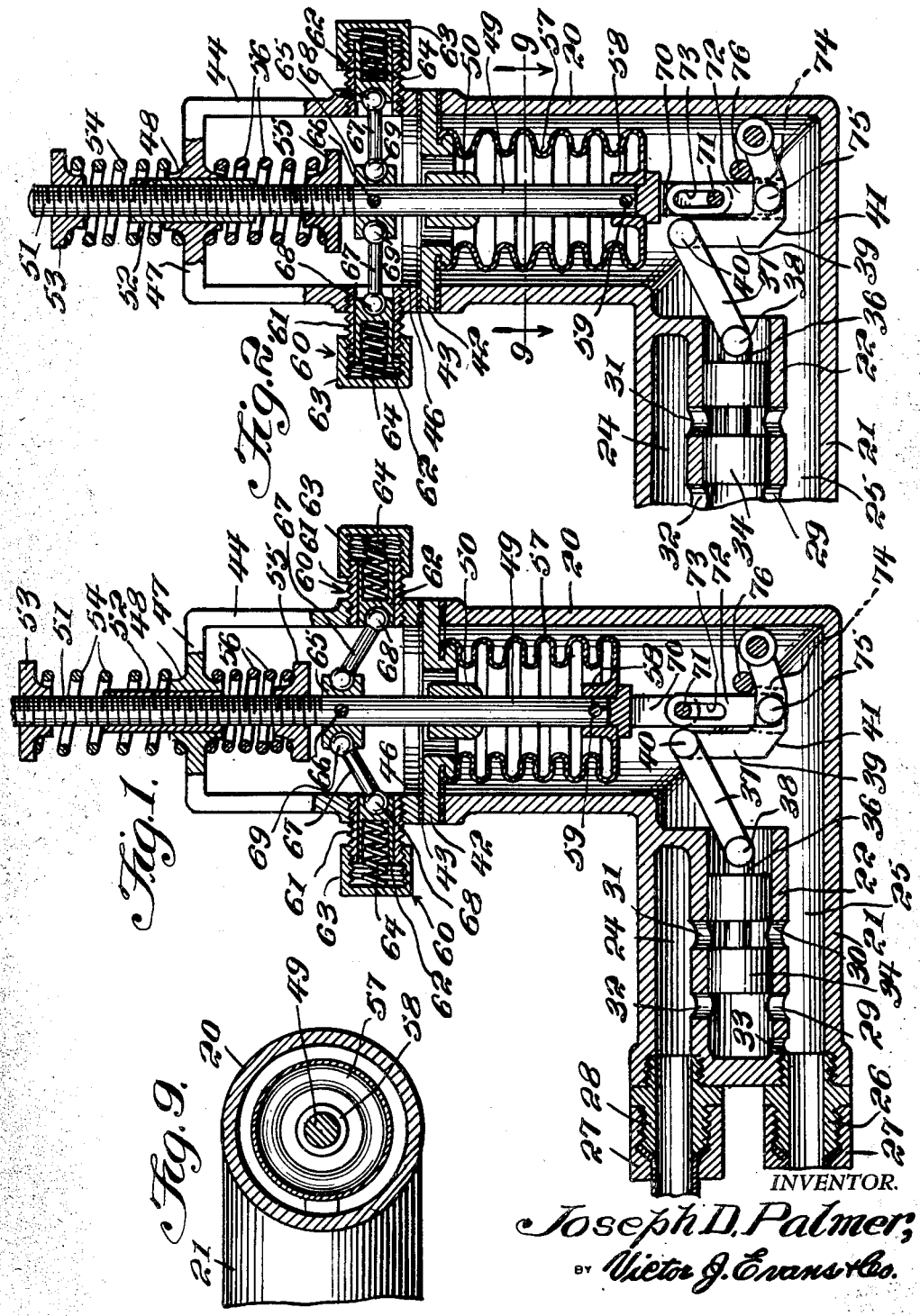

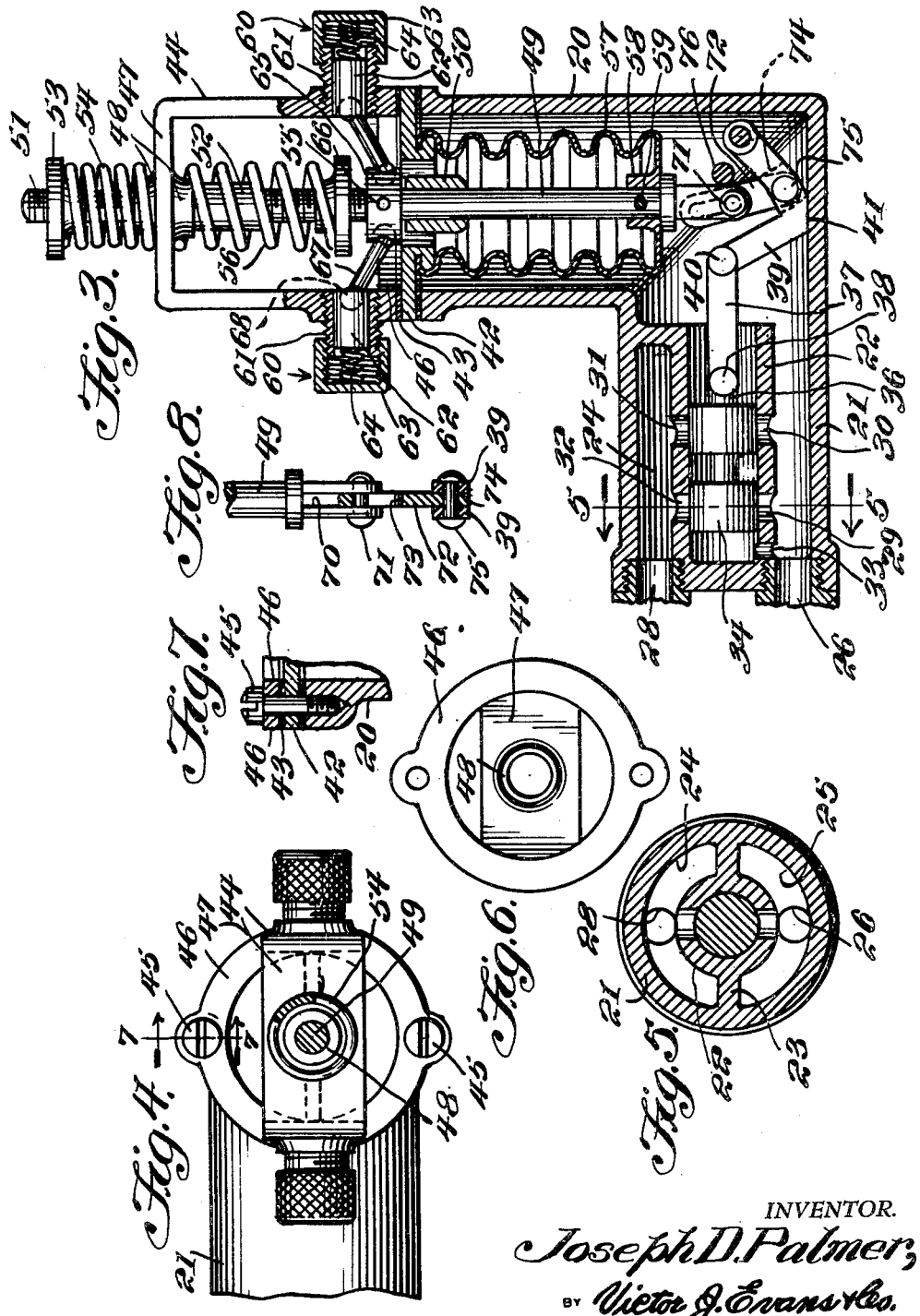

2,671,632

UNITED STATES PATENT OFFICE 2,671,632

PISTON VALVE

Joseph D. Palmer, Tulare, Calif.; Catherine Palmer Wofford, administratrix of Joseph D. Palmer, deceased Application March 24, 1949, Serial No. 83,219

1 Claim. (Cl. 251—75)

This invention relates to a valve, and more particularly to a valve for controlling the flow of fluid to a compressor.

The object of the invention is to provide a valve which is adapted to be interposed in a conduit conveying fluid whereby the valve will control the flow of fluid from the conduit to a compressor in response to the pressure of fluid in the line or conduit.

Another object of the invention is to provide a pressure actuated valve which will stop the flow of fluid to a compressor when the pressure in the line leading to the compressor drops below a predetermined degree.

A further object of the invention is to provide a valve which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the valve, with parts thereof broken away and in section, according to the present invention, the valve being open;

Figure 2 is a view similar to Figure 1, showing the position of the parts of the valve when the valve is in equilibrium;

Figure 3 is a central sectional view of the valve, showing the position of the parts when the valve is closed;

Figure 4 is a top plan view of the valve;

Figure 5 is a sectional view taken on the line 5—5 of Figure 3;

Figure 6 is a bottom plan view of the sealing ring and yoke;

Figure 7 is a sectional view taken on the line 7—7 of Figure 4;

Figure 8 is a fragmentary view showing certain constructional details of the valve; and Figure 9 is a sectional view taken on the line 9—9 of Figure 2.

Referring in detail to the drawings, the numeral 20 designates a housing which may be fabricated of any suitable material. Arranged at right angles with respect to an end of the housing 20 is a hollow casing 21 which may be formed integral with or secured to the housing 20 as desired. Arranged in spaced concentric relation within the casing 21 is a cylinder 22, the cylinder 22 being supported in the casing 21 by means of suitable supporting members 23, Figure 5. The members 23 coact with the cylinder 22 and casing 21 to define a pair of semi-cylindrical chambers 24 and 25. A first conduit 26 is arranged in threaded engagement with the casing 21, Figures 1 and 3, and a suitable bushing 27 is threaded onto the conduit 26. A second conduit 28 is arranged in threaded engagement with the casing 21, and the conduit 28 communicates with the upper chamber 24 for a purpose later to be described, there being a suitable bushing 27 threaded onto the conduit or line 28.

The wall of the cylinder 22 is provided with ports 29, 30, 31 and 32, and these ports are arranged in spaced relation with respect to each other. A suitable aperture 33 is also arranged in the wall of the cylinder 22 for equalizing the pressure in the end of the cylinder. Slidably arranged in the cylinder 22 is a piston 34 which is provided with a transverse annular cutout or groove 35 which is adapted to selectively open and close the ports 29 through 32 for controlling the flow of fluid therethrough. Projecting from the front end of the piston 34 and secured thereto is an ear 36, and a link 37 has one of its ends pivotally connected to the projecting end of the ear 36 by means of a pin 38. The other end of the link 37 is pivotally connected to an arm 39 by means of a pin 40. The arm 39 includes a flat portion 41 which is adapted to contact the interior surface of the casing 21 when the valve is in closed position.

Supported on the other end of the housing 20 is an annular rim 42, there being a gasket 43 arranged between the rim 42 and a yoke 44. The yoke 44 is arranged adjacent to the rim 42, and suitable headed bolts 45, Figures 4 and 7, project through the apertured flange 46 which is formed integral with the yoke 44. The bolts 45 also project through the rim 42 and into the housing 20 for maintaining the parts in assembled relation.

Formed integral with, or secured to the web 47 of the yoke 44 is a bushing 48. An elongated rod 49 is slidably supported in a web 50 which is secured to the inner surface of the housing 20. The rod 49 has a portion of its interior surface threaded exteriorly as at 51 there being a sleeve 52 threaded on the rod 49, and the sleeve 52 slidably rides in the bushing 48. A tension nut 53 is threaded onto the projecting end of the rod 49 and a suitable coil spring 54 is circumposed on the rod 49 and the coil spring 54 is interposed between the nut 53 and the web 47 of the yoke 44.

A second tension nut 55 is also threaded on the rod 49, and a suitable coil spring 56 is interposed between the nut 55 and the web 47 for normally urging the rod 49 into the housing 20, the coil spring 54 normally urging the rod 49 out of the housing 20.

A suitable flexible bellows 57 has its free end positioned between the rim 42 and the housing 20, while the other end of the bellows 57 is secured to a collar 58, the collar 58 being secured to the rod 49 by means of a pin 59, Figure 1. The bellows 57 serves to urge the rod 49 out of the open end of the housing 20 when the pressure in the housing exceeds a predetermined degree. A pair of toggle switches 60 are carried by the yoke 44, and each toggle switch comprises a threaded sleeve 61 which has slidably supported therein a plunger 62. An exteriorly knurled cap 63 is arranged in threaded engagement with the sleeve 61 and a suitable coil spring 64 is positioned or interposed between the cap 63 and the plunger 62 for normally urging the plunger 62 away from the cap 63. A collar 65 is mounted on the rod 49 intermediate its ends, and a pin or rivet 66 secures the collar 65 to the rod 49. A pair of links 67 each have one end connected to the complemental plunger 62 by a ball and socket joint 68 while the other end of each of the links 67 is pivotally connected to the collar 65 by a ball and socket joint 69.

The inner or lower end of the rod 49 is provided with a slot 70, Figure 8. A pin 71 is carried by the inner end of the rod 49 and slidably positioned in the slot 70 is a lever 72 which is provided with a slot 73 through which projects the pin 71. The lever 72 projects into a slot 74 in the arm 39 and a pin 75 pivotally connects the lever 72 to the arm 39. A stop member 76 is secured to the housing 20 and the stop member 76 is adapted to be contacted by a portion of the arm 39 for limiting upward movement of the rod 49.

In use, the valve may be inserted in a refrigeration system wherein the conduit 26 will convey suitable gaseous fluid from a cooling coil and the fluid will enter the compartment 25. When the pressure of this fluid is sufficiently high, the bellows 57 will be contracted. There are several forces acting in various ways on the rods 39. Thus, the pressure of the bellows 57 and the pressure exerted by the coil spring 54 normally tend to urge the rod 49 upward or out of the housing 20, while the coil spring 56 normally urges the rod 49 downwardly or into the housing 20. The toggle switches 60 serve to increase the effectiveness of the coil springs 54 and 56, depending on which position the rod 49 is in. Therefore, assuming that the pressure is sufficient to overcome the pressure exerted by the spring 56, then the rod 49 will be in the position shown in Figure 1 and when the rod is in such position, the piston 34 is arranged so that gas can pass through the port 29 and out through port 32 and into compartment 24. Also, gas can pass through ports 30 through the annular groove 35 in the piston 34, and out through port 31 into compartment 24. The gas then leaves compartment 24 and is conveyed or passes to a compressor (not shown). The compressor will of course operate to pump this fluid through the line 28 until the pressure has fallen below a predetermined degree. Then when the pressure falls sufficiently, the force exerted by the spring 56 will overcome the total pressure exerted by the spring 54, toggle switches 60, and bellows 57 to move the rods 49 downwardly to the position shown in Figure 3. This movement of the rod 49 causes the piston 34 to move in the cylinder 22 to thereby close the ports 29 through 32 so that no gas can pass therethrough and into the compressor. Thus, the valve will remain closed until the pressure again builds up sufficiently to cause the valve to automatically open.

The nuts 53 and 55 and the caps 63 can be readily adjusted so that the tension of the respective coil springs can be varied as desired. Further, the valve could be used as a suction throttling valve wherein gas could be conveyed into the valve through line 28, and the gas leaving the valve will pass through line 26. In using the valve as a suction throttling valve, the link 37 is lengthened so that the valve closes and opens when the pressure varies beyond a predetermined range.

While I have shown and described a preferred embodiment of my invention, this is by way of illustration only and I consider as my own all such modifications in construction as fairly fall within the scope of the appended claim.

I claim:

In a valve, a casing, a cylinder arranged in said casing in spaced concentric relation to said casing, a pair of supporting members supporting said cylinder within said casing, said members coacting with said cylinder and said casing to define inlet and outlet chambers, a plurality of ports arranged in said cylinder, a first conduit arranged in threaded engagement with an end of said casing for the ingress therethrough of fluid and the axis of the first conduit lying in a separate plane from the axes of the cylinder and casing but parallel thereto, a second conduit arranged in threaded engagement with the same end of said casing for the egress therethrough of fluid, and the axis of the second conduit being in a separate plane from the axis of the first conduit but parallel thereto, and a piston slidably arranged in said cylinder and adapted to selectively open and close the ports of said cylinder for controlling the flow of fluid through said ports.

JOSEPH D. PALMER.

References Cited in the file of this patent

UNITED STATES PATENTS

| Number | Name | Date |
| --- | --- | --- |
| 1,735,511 | Shrode | Nov. 12, 1929 |
| 1,740,135 | Wishart | Dec. 17, 1929 |
| 1,800,243 | Birks | Apr. 14, 1931 |
| 1,847,073 | Ernst | Mar. 1, 1932 |
| 1,922,928 | Cave | Aug. 15, 1933 |
| 1,927,609 | Markert | Sept. 19, 1933 |
| 1,953,433 | Replogle | Apr. 3, 1934 |
| 2,010,500 | Smith | Aug. 6, 1935 |
| 2,209,418 | Overbeke | July 30, 1940 |
| 2,226,611 | McCollum | Dec. 31, 1940 |
| 2,327,366 | Nampa | Aug. 24, 1943 |
| 2,525,487 | Johnson | Oct. 10, 1950 |